| United States Patent [19] | [11] | 4,193,852 |
|---|---|---|
| Inoue | [45] | Mar. 18, 1980 |

[54] METHOD AND APPARATUS FOR ELECTRICAL MACHINING WITH A MULTI-GUIDED TRAVELLING ELECTRODE

[75] Inventor: Kiyoshi Inoue, Tokyo, Japan

[73] Assignee: Inoue-Japax Research Incorporated, Yokohama, Japan

[21] Appl. No.: 915,206

[22] Filed: Jun. 13, 1978

[30] Foreign Application Priority Data

| Jun. 14, 1977 | [JP] | Japan | 52-70248 |
| Jul. 18, 1977 | [JP] | Japan | 52-85889 |
| Dec. 21, 1977 | [JP] | Japan | 52-154959 |

[51] Int. Cl.² .......... B23P 1/10; B23P 1/12; B23P 1/16; B23P 1/00
[52] U.S. Cl. .......... 204/129.46; 204/129.6; 204/129.75; 204/209; 204/211; 204/224 M; 204/228; 219/69 W
[58] Field of Search .......... 204/224 M, 225, 228, 204/129.6, 129.43, 206, 209, 211, 129.46, DIG. 9; 219/69 W, 69 E; 51/21; 125/21

[56] References Cited

U.S. PATENT DOCUMENTS

| 2,526,423 | 10/1950 | Rudorff | 204/224 |
| 3,436,322 | 4/1969 | Good et al. | 204/211 X |
| 3,538,289 | 11/1970 | Burnett et al. | 219/69 W X |
| 3,642,601 | 2/1972 | Kondo | 204/206 |
| 3,831,576 | 8/1974 | Mech | 125/21 X |
| 3,928,163 | 12/1975 | Ullman et al. | 204/224 M X |
| 4,052,274 | 10/1977 | Chikamori | 204/129.43 |
| 4,052,584 | 10/1977 | Reznicek | 219/69 W X |
| 4,103,137 | 7/1978 | Levitt et al. | 219/69 W |

*Primary Examiner*—John H. Mack
*Assistant Examiner*—D. R. Valentine
*Attorney, Agent, or Firm*—Karl F. Ross

[57] ABSTRACT

A traveling wire electrical machining system makes use of a single-strand traveling wire which is guided in a plurality of passes across a workpiece to cut through the latter at a plurality of parallel locations. According to the invention, the machining power supply has a plurality of outputs each of which is connected to a respective stretch of the traveling wire, thereby equalizing the machining current for each of the multiple stretches.

30 Claims, 3 Drawing Figures

METHOD AND APPARATUS FOR ELECTRICAL MACHINING WITH A MULTI-GUIDED TRAVELLING ELECTRODE

FIELD OF THE INVENTION

The present invention relates generally to traveling-wire-type electrical machining apparatus and, more particularly, to an apparatus for electrical machining with a multi-guided traveling wire-type electrode wherein machining of a workpiece is effected by successive electrical discharges and/or electrolytic action between the electrode and the workpiece through a machining fluid with or without concomittant use of abrasive grains which are bonded to the wire-type electrode or supplied in suspension with the machining fluid into the machining region to provide an additional abrasive machining action upon the workpiece.

BACKGROUND OF THE INVENTION

In the travelling wire-type electrical machining, a continuous wire electrode is moved while being axially guided between support members under a suitable tension and a workpiece is disposed in juxtaposition with the wire electrode moving between the support members. Electric energy is applied between the moving wire electrode and the workpiece to remove material from the latter. The electric energy may be applied in the form of a series of electrical discharges when the machining fluid is constituted by a liquid dielectric or a continuous or pulsed electrolyzing current when the machining fluid is a liquid electrolyte. Sometimes, it is desirable to additionally provide abrasive machining action whereby electrical-discharge and/or electrolytic machining actions on the workpiece are facilitated. As material removal from the workpiece proceeds, the latter is displaced relative to the axially travelling wire-electrode in a prescribed path under numerical or mechanical copying control to achieve a desired cutting pattern.

When a plurality of cuts of an identical or similar pattern are to be made simultaneously in a workpiece or workpieces, it is convenient to arrange a single, continuous axially travelling wire electrode so that the latter is "multi-guided" between the support members in the form of the plurality of moving wire segments extending in parallel with one another. In the prior art, however, in which one output terminal of a machining power supply is connected to the workpiece and the other output is electrically connected to a single current conducting guide through which the single wire electrode travels, this measure has most often been unsuccessful or has yielded unsatisfactory results because of very frequent occurrence of the rupture of the wire electrode. This problem has now been found to be attributable to the fact that the wire electrode typically used is as thin in diameter as 0.05 to 0.5 mm so that the resistance varies from one wire segment to another, causing irregular current distribution between different wire segments and the workpiece. Further, once short-circuiting occurs at a certain wire location, the current flow will be concentrated at the short-circuited point, eventually causing wire breakage.

OBJECT OF THE INVENTION

It is, accordingly, the object of the present invention to provide an apparatus for electrical machining with a multi-guided travelling wire-type electrode whereby the aforesaid problem is overcome.

SUMMARY OF THE INVENTION

In accordance with the present invention, there is provided an improved apparatus for electrical machining with a multi-guided traveling-wire-type electrode, the apparatus comprising an individual output from a common power supply for each moving wire segment such that the current distribution between the individual wire segments and the work-piece is substantially equalized. The power supply preferably includes a transformer having a primary winding to which is applied an alternating current or pulse train and a plurality of secondary windings in each of which is induced a transformed alternating current which directly or after half-wave rectification or after full-wave rectification followed by pulsing at a desired frequency is supplied to the individual machining gap between each moving wire segment and the workpiece. Alternatively, a direct-current or pulse output may be multi-divided by divider resistors corresponding in number to the wire segments provided to produce divided outputs for application between the individual moving wire segments and the workpiece.

BRIEF DESCRIPTION OF THE DRAWING

The accompanying drawing illustrates certain embodiments of the apparatus according to the invention. In the drawing.

SPECIFIC DESCRIPTION

Figure 1:
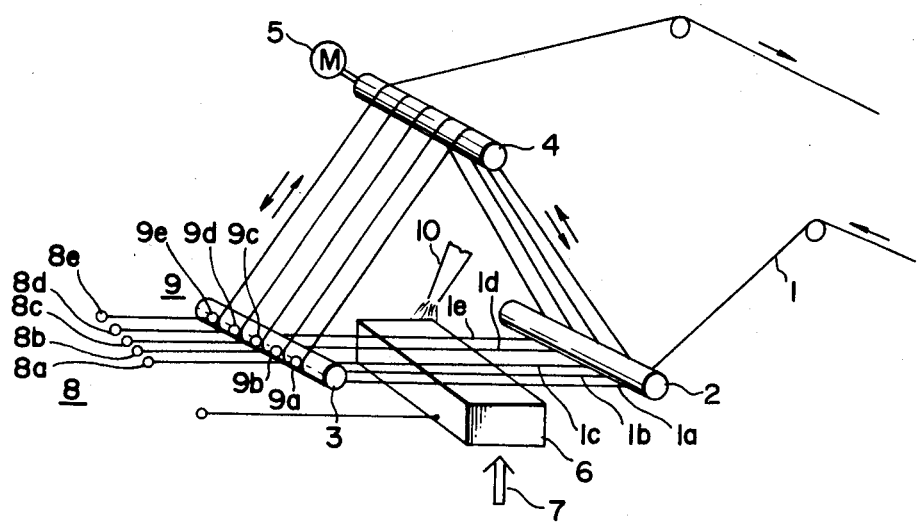
FIG. 1 is a perspective view diagrammatically showing an arrangement of a multi-guided travelling wire electrode.

Referring now to FIG. 1, there is shown a single, continuous wire-type machining electrode 1 which is typically of 0.05 to 0.5 mm in diameter and may be composed of copper or brass or an alloy thereof where purely electrical machining (electrical-discharge machining and/or electrolytic machining) actions are utilized. Alternatively, where abrasive actions are supplementarily used, the wire 1 may consist of a piano wire or tungsten. In the latter case, abrasive particles of diamond, BN, B$_4$C, SiC, ZnO$_2$, SiO$_2$, Al$_2$O$_3$, Si$_3$N or the like may be bonded to the wire 1 with the aid of electrodeposition or the use of an adhesive or may alternatively be supplied in suspension to the vicinity of the wire electrode 1 travelling through the machining region.

The single, continuous wire 1 is shown guided in a plurality of turns by and on a pair of principal machining guide or support members 2 and 3 and a drive guide or support member 4, the latter being rotatingly driven. The guide members 2, 3 and 4 are arranged in parallel with one another. Thus, the continuous wire electrode 1 supplied from the direction of arrow while spanningly wound and unwound successively forms a plurality of travelling machining wire-electrode segments 1a, 1b, 1c, 1d and 1e arranged in parallel with one another between the guide members 2 and 3 between which is disposed a workpiece 6 to be multiple-cut. The workpiece in the course of the machining operation is advanced in the direction of arrow 7. As also illustrated, an axial vibration or reciprocation may be imparted optionally to the unidirectionally travelling wire electrode 1 to facilitate material removal or machining operation.

The electrical input 8 for the multi-guided wire electrode 1, in accordance with the invention, includes individual input terminals 8a, 8b, 8c, 8d and 8e provided for wire segments 1a, 1b, 1c, 1d and 1e, respectively and connected thereto via brushes 9a, 9b, 9c, 9d and 9e in contact individually therewith. A machining-fluid nozzle is shown at 10.

In operation, a machining fluid is supplied from the nozzle 10 over the plurality of machining zones formed between the workpiece 6 and the respective wire segments 1a to 1e. The machining fluid is a liquid dielectric such as distilled water or oil in electrical discharge machining (EDM) and a liquid electrolyte in electrochemical or electrolytic machining (ECM). The machining electrical energy is supplied from the terminals 8 typically in the form of a succession of electrical pulses both in EDM and ECM or ECDM (electrochemical-discharge machining which employs a combination of EDM and ECM actions). In the latter two cases, a direct current, an alternating current or a direct current on which is superimposed an alternating current can be employed. Further, supplemental machining action by the use of abrasive particles may be additionally utilized as has been described. In these and modified machining processes, a substantially equalized machining current distribution over all of desired machining zones is assured by the divided current output supply in accordance with the invention to achieve a simultaneous multiple machining with uniformity and precision.

Figure 2:
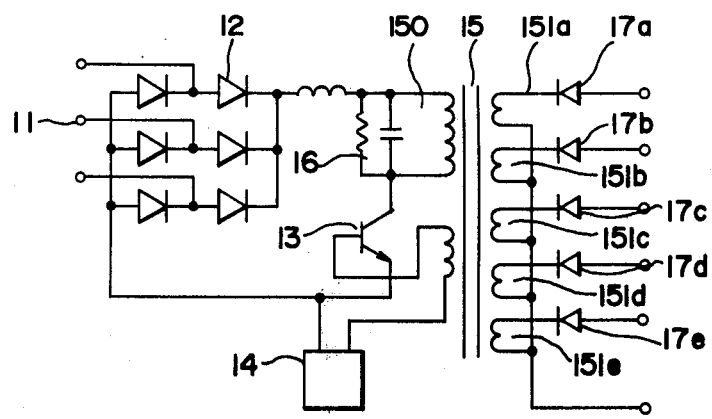
FIG. 2 is a circuit schematic diagrammatically showing a power supply adapted for the apparatus accordng to the invention.

Referring to FIG. 2, a power supply for providing the machining power input 8 with divided current outputs comprises input terminals 11 adapted to receive a commercial alternating-current (AC) power which is rectified by a full-wave rectifier unit 12 to provide a direct-current (DC) power. A switching element 13, e.g., a transistor, is controlled in response to a pulser or oscillator 14 for pulsing the DC output of the rectifier 12 thereby producing a succession of pulses of a frequency much higher than that of the input or commercial AC, say at least 1 kHz. The switching frequency of output pulses is, of course, set at the oscillator or pulser 14. A high-frequency AC is thus produced by a parallel circuit of a primary winding 150 of a transformer 15 and a capacitor 16. The transformer 15 is here provided with a plurality of secondary windings 151a, 151b, 151c, 151d and 151e corresponding in number to wire segments 1a, 1b, 1c, 1d and 1e and shown connected on one hand to input terminals 8a, 8b, 8c, 8d and 8e via diodes 17a, 17b, 17c, 17d and 17e, respectively, and on the other hand to the workpiece terminal 6. An equalized machining current in the form of pulses of a frequency established at the oscillator or pulser 14 is thus delivered between each of the segments 1a to 1e and the workpiece 6.

The circuit arrangement of FIG. 2 as has been described may be called an AC-DC-HF-DC inverter and has the unique advangate that the entire power supply unit is reduced both in size and weight. Further, by variably adjusting the duty factor and the frequency of a high-frequency (HF) AC to be generated, the output control and regulation are readily attained and the high-frequency operation inherently assures an extremely high control response. In addition, since the HF-AC output is substantially of a rectangular waveform, energy efficiency of the system is excellent and machining pulses and any desirable practical pulse parameters are here easily obtained. It should also be noted that provision of a full-wave rectifier, in lieu of the half-wave rectifier 17a–17e shown, and a smoothing network provides a direct-current output useful for typical ECM operations and further provision of a switching circuit permits production of further modified pulses for desired machining purposes.

Figure 3:
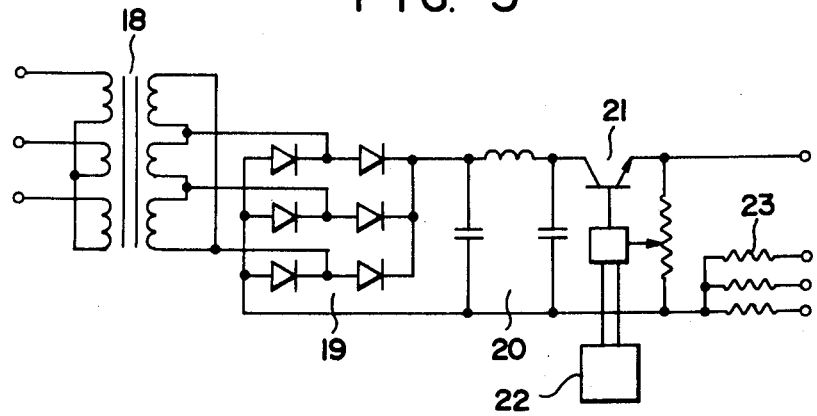
FIG. 3 is a circuit schematic diagrammatically showing another power-supply arrangement which may be used in the practice of the invention.

In a circuit arrangement of FIG. 3, a commercial three-phase AC input transformed by a transformer 18 is fed to a rectifier 19 whose unidirectional output is fed in turn to a smoothing network 20 comprising a choke and capacitors. The latter network thus provides a DC output of a desired voltage magnitude in the usual manner. The DC output is pulsed by a switching element 21, here again shown as a transistor, which is controlled in response to a oscillator or pulser 22 for producing a succession of pulses of pulse parameters preset at the latter. This common pulsed DC output is then fed through divider resistors 22 which correspond in number to wire segments 1 and are individually connected to the corresponding segments via brushes 9. In this embodiment as well, an equalized current distribution over a plurality of machining gaps formed between individual parallel wire segments and the workpiece is assured, thereby permitting machining operations with stability and similarity precision.

In general, when a single continuous wire electrode such as a piano wire which is typical in the process is wound and guided on guide rollers 2, 3 and 4 in a plurality of parallel turns as shown in FIG. 1, the wire resistance between the machining guides 2 and 3 will be approximately 10 ohms for the wire of 0.1 mm diameter and approximately 3 ohms for the wire of 0.3 mm diameter. Resistance irregularity from one machining gap to another in multiple-gap travelling wire-type electrode machining arising from such local resistance irregularities is overcome in accordance with the invention by provision of divided power transmission as has been described so that machining at stability is achieved without the occurrence of a concentrated current flow.

EXAMPLE I

In a specific example, a wire electrode of 0.16 mm diameter consisting of a piano wire on which diamond particles of 300 meshes are cladded by nickel electroplating to have an overall diameter of 0.2 mm is used. The wire is wound on guides in three turns and these parallel wire segments are advanced between the machining guides at a maximum rate of displacement of 13 meters/second while being axially reciprocated, each in juxtaposition with a single workpiece. Machining of various workpiece materials are tested with or without application of electrical current between individual wire segments and each workpiece, the current being of pulses of a pulse duration of 10 microseconds, a pulse interval of 20 microseconds and a voltage level of 20 volts. The tests yield the following results:

| Workpiece material | Removal rate with equalized current distribution | Removal rate without current application |
|---|---|---|
| SKH (steel) | 3 mm$^2$/min | 0.9 mm$^2$/mm |
| W | 1.5 mm$^2$/min | 0.6 mm$^2$/mm |

| Workpiece material | Removal rate with equalized current distribution | Removal rate without current application |
|---|---|---|
| WC | 2.8 mm²/min | 0.7 mm²/mm |
| Co | 5.1 mm²/min | 1.67 mm²/mm |

From the above table, it is apparent that the removal rate is increased in each material by approximately three times or more when an equalized current distribution is assured in comparison with machining operations in which no current is applied.

EXAMPLE II

In a further example, a piano wire of 0.18 mm diameter in used to cut a S55C steel workpiece of 58 Rockwell hardness at a wire axial rate of displacement of 0.05 mm/min and under an urging pressure of the workpiece against the travelling wire at 38 grams and with abrasive particles of $B_4C$ of 200 mesh size being supplied in suspension in a cutting fluid to the cutting regions. The cutting speed is 20 mg/min. In comparison, when a liquid electrolyte of sodium nitrate and abrasive particles of the abovesaid type are supplied in mixture of 1 part/10 parts to the cutting regions and a direct current of 1.5 ampere is supplied between the wire segments and the workpiece, the cutting speed of the workpiece is increased to 74 mg/min.

When a generally non-conductive or semiconductive material (say, of a resistivity at least 50 ohm-cm) is to be machined by electrical machining with a travelling wire-type electrode with or without abrasive grains, it is desirable to use oil or distilled water of a resistivity of at least $10^3$ ohm-cm and at the same time to apply across a machining gap an electrical energy of a voltage at least 50 volts, preferably in the form of a succession of pulses. Furthermore, the water is preferably prepared to have a resistivity of the range defined above by adding a rust-preventive agent (including a surfactant) to a water fluid obtained by ion-exchange treatment.

Thus, in a further specific example, a piano wire of 0.2 mm diameter is axially displaced at a rate of 10 meters/second in each machining step to cut silicon, rock-crystal and white-alumina workpieces. The wire has SiC abrasive particles of 600 mesh bonded thereon or such abrasive particles are used in the form of a suspension in a machining fluid (1 part abrasive/2 parts machining fluid), using the wire without the abrasive bond. The machining fluid is chosen from a fluid of 50 parts kerosine/50 parts transformer oil and water prepared by ion-exchange treatment but to which is added 2% by weight sorbit ($CH_2OH(CHOH)_4CH_2OH$) as a rust preventer and 0.5% by weight lauric acid as a surfactant to have a specific resistivity of approximately $5 \times 10^3$ ohm-cm. In accordance with the present invention, a machining current in the form of pulses of a voltage of 700 volts, a pulse duration of 10 microseconds and a pulse interval of 15 microseconds is applied between each wire segment and a workpiece while the machining fluid is flushed to the machining gaps. Each machining gap has a voltage gradient of approximately 1000 volts/mm. The following table shows test results as compared with those by the conventional purely abrasive-wire cutting in which no electric current is applied to the machining gap.

| | Conventional (*MF: oil) | Invention (MF: oil) | | Invention (MF: water) | |
|---|---|---|---|---|---|
| Workpiece | BA** | BA | SA*** | BA | SA |
| Si | 14.2 mm²/min | 18.2 mm²/min | 15.3 mm²/min | 18.4 mm²/min | 16.6 mm²/min |
| Rock crystal | 3.33 mm²/min | 4.6 mm²/min | 5.1 mm²/min | 3.8 mm²/min | 4.4 mm²/min |
| W.alumina | 0.18 mm²/min | 0.3 mm²/min | 0.2 mm²/min | 0.7 mm²/min | 0.8 mm²/min |

*MF : Machining fluid.
**BA : Bonded abrasives.
***SA : Suspended abrasives

I claim:

1. A method of operating a traveling-wire electrical machining apparatus wherein a single-strand traveling wire is guided in a plurality of passes in juxtaposition with a workpiece, said method comprising the steps of:
   relatively displacing said workpiece and said wire so that respective stretches of the wire cut through said workpiece at respective locations;
   applying a machining liquid to said locations; and
   applying across the workpiece and each of said stretches individually a machining current from a common power supply, thereby equalizing the current distribution to said stretches of said wire.

2. The method defined in claim 1 wherein said machining liquid is distilled water.

3. The method defined in claim 1 wherein said machining liquid is an electrolyte.

4. The method defined in claim 1 wherein said machining liquid contains abrasive particles in suspension.

5. The method defined in claim 4 wherein said abrasive particles are composed of at least one substance selected from the group consisting of diamond, boron nitride, boron carbide, silicon carbide, zinc oxide, silicon oxide, aluminum oxide and silicon nitride.

6. The method defined in claim 1 wherein said wire electrode has abrasive particles bonded thereon.

7. The method defined in claim 6 wherein said abrasive particles are composed of at least one substance selected from the group consisting of diamond, boron nitride, boron carbide, silicon carbide, zinc oxide, silicon oxide, aluminum oxide and silicon nitride.

8. The method defined in claim 1 wherein said wire electrode has a diameter in the range between 0.05 and 0.5 mm.

9. The method defined in claim 8 wherein said wire electrode is composed at least in part of a substance selected from the group consisting of piano wire, tungsten, copper and brass.

10. The method defined in claim 1 wherein said workpiece consists of a material of a specific resistivity of at least 50 ohm-cm, said machining fluid having a specific resistivity of at least $10^3$ ohm-cm, and said common power supply has a voltage level of at least 50 volts.

11. The method defined in claim 10 wherein said machining fluid includes distilled water prepared by ion-exchange treatment and a rust-preventing agent in an amount sufficient to render the water to be of a specific resistivity of at least $10^3$ ohm-cm.

12. An apparatus for electrical machining comprising:
a single continuous wire-type electrode;
means for axially moving said electrode;
support members for multi-guiding said electrode in a plurality of turns in the form of the plurality of moving wire segments extending in parallel with one another in juxtaposition with a workpiece to be machined thereby across respective machining gaps;
means for supplying said respective machining gaps with a machining fluid; and
a multiple-output single power supply for energizing said wire electrode with said workpiece, said power having an individual output provided respectively for each moving wire segment and a common output of a polarity opposite to that of the individual outputs and connectible to the workpiece.

13. The apparatus defined in claim 12 wherein said power supply comprises a first output terminal connected to said workpiece and a plurality of second output terminals which correspond in number to and are respectively connected to said different wire segments.

14. The apparatus defined in claim 12 wherein said wire electrode has abrasive particles bonded thereon.

15. The apparatus defined in claim 12, further comprising
means for supplying abrasive particles to the regions of the machining gaps in suspension in said machining fluid.

16. The apparatus defined in claim 14 or claim 15 wherein said abrasive particles are composed of at least one substance selected from the group consisting of diamond, boron nitride, boron carbide, silicon carbide, zinc oxide, silicon oxide, aluminum oxide and silicon nitride.

17. The apparatus defined in claim 12 wherein said wire electrode has a diameter in the range between 0.5 to 0.5 mm.

18. The apparatus defined in claim 17 wherein said wire electrode is composed at least in part of a substance selected from the group consisting of piano wire, tungsten, copper and brass.

19. An apparatus for electrical machining comprising:
a single continuous wire-type electrode;
means for axially moving said electrode;
support members for multi-guiding said electrode in a plurality of turns in the form of the plurality of moving wire segments extending in parallel with one another in juxtaposition with a workpiece to be machined thereby across respective machining gaps;
means for supplying said respective machining gaps with a machining fluid; and
a multiple-output single power supply for energizing said wire electrode and said workpiece, said power supply having an individual output provided respectively for each moving wire segment, said power supply comprising:
a first output terminal connected to said workpiece and a a plurality of second output terminals which correspond in number to and are respectively connected to said different wire segments;
input means for receiving a commercial alternating current;
a rectifier for converting said commercial alternating current to a direct current;
means for pulsing said direct current to produce a high-frequency alternating-current or pulse output at a frequency much higher than that of said commercial alternating current; and
a transformer for transforming the voltage magnitude of said high-frequency output to a desired level, said transformer having a primary winding operatively connected to said pulsing means and a plurality of secondary windings corresponding in number to and being connected at said output terminals to said plurality of wire segments, respectively.

20. The apparatus defined in claim 19 wherein each individual secondary winding is connected to each wire segment via a rectifier so that a succession of unidirectional pulses are applied between each of the wire segments and the workpiece.

21. The apparatus defined in claim 19 wherein said wire electrode has abrasive particles bonded thereon.

22. The apparatus defined in claim 19, further comprising means for supplying abrasive particles to machining gaps between each of said wire segments and said workpiece in suspension in said machining fluid.

23. The apparatus defined in claim 19 wherein said wire electrode has a diameter between 0.05 and 0.5 mm.

24. The apparatus defined in claim 19 wherein said wire electrode is composed at least in part of a substance selected from the group consisting of piano wire, tungsten, copper and brass.

25. An apparatus for electrical machining comprising:
a single continuous wire-type electrode;
means for axially moving said electrode;
support members for multi-guiding said electrode in a plurality of turns in the form of the plurality of moving wire segments extending in parallel with one another in juxtaposition with a workpiece to be machined thereby across respective machining gaps;
means for supplying said respective machining gaps with a machining fluid; and
a multiple-output single power supply for energizing said wire electrode and said workpiece, said power supply having an individual output provided respectively for each moving wire segment, said power supply comprising:
a first output terminal connected to said workpiece and a plurality of second output terminals which correspond in number to and are respectively connected to said different wire segments; and
a direct-current source having a plurality of resistors corresponding in number to and connected to said plurality of wire segments.

26. The apparatus as defined in claim 25, further comprising a switching network arranged between said direct-current source and said resistors for producing a succession of machining pulses to be delivered to each machining gap between each of said wire segments and the workpiece via the respective one of said output resistors.

27. The apparatus as defined in claim 25 wherein said wire electrode has abrasive particles bonded thereon.

28. The apparatus defined in claim 25, further comprising means for supplying abrasive particle to machining gaps between each of said wire segments and said workpiece in suspension in said machining fluid.

29. The apparatus defined in claim 25 wherein said wire electrode has a diameter between 0.05 and 0.5 mm.

30. The apparatus defined in claim 25 wherein said wire electrode is composed at least in part of a substance selected from the group consisting of piano wire, tungsten, copper and brass.

* * * * *